US 9,829,755 B1

(12) United States Patent
Tae et al.

(10) Patent No.: US 9,829,755 B1
(45) Date of Patent: Nov. 28, 2017

(54) DISPLAY DEVICE AND METHOD OF MANUFACTURING THE SAME

(71) Applicant: Samsung Display Co., Ltd., Yongin-si (KR)

(72) Inventors: Chang Il Tae, Seoul (KR); Seung Jun Yu, Cheonan-si (KR); Joo Lark Son, Suwon-si (KR); Young Goo Song, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/344,717

(22) Filed: Nov. 7, 2016

(30) Foreign Application Priority Data

May 3, 2016 (KR) .................. 10-2016-0054740

(51) Int. Cl.
*G02F 1/1343* (2006.01)
*G02F 1/1335* (2006.01)

(52) U.S. Cl.
CPC .. *G02F 1/134336* (2013.01); *G02F 1/133512* (2013.01); *G02F 1/134309* (2013.01); *G02F 2201/123* (2013.01)

(58) Field of Classification Search
CPC ......... G02F 2201/123; G02F 2201/124; G02F 1/134336; G02F 1/133512; G02F 1/134363; G02F 1/134309
See application file for complete search history.

(56) References Cited

U.S. PATENT DOCUMENTS

| 8,314,899 | B2 | 11/2012 | Tanahara |
| 8,318,270 | B2 | 11/2012 | Seong et al. |
| 2012/0075562 | A1* | 3/2012 | Yeh ........... G02F 1/1323 349/139 |
| 2012/0281174 | A1* | 11/2012 | Yeh ........... G02F 1/1323 349/129 |
| 2016/0327838 | A1* | 11/2016 | Li ............. G02F 1/1362 |
| 2017/0176822 | A1* | 6/2017 | Yoon ......... G02F 1/134336 |
| 2017/0192317 | A1* | 7/2017 | Song ......... G02F 1/134336 |

FOREIGN PATENT DOCUMENTS

KR 10-2011-0130177 12/2011

* cited by examiner

*Primary Examiner* — Joseph L Williams
*Assistant Examiner* — Jose M Diaz
(74) *Attorney, Agent, or Firm* — H.C. Park & Associates, PLC

(57) ABSTRACT

A display device includes a first substrate, a first pixel and a second pixel disposed adjacent to each other on the first substrate, and a pixel electrode disposed in each of the first and second pixels, each pixel electrode including a first stem extending in a first direction between two first end portions, a second stem intersecting the first stem and extending between two second end portions, and an intersection disposed where the first stem and the second stem meet, in which the first and second end portions define at least a portion of an outer extent of a pixel area in each pixel, and a first distance from a center of the pixel area of the first pixel to the intersection of the first pixel is different from a second distance from a center of the pixel area of the second pixel to the intersection of the second pixel.

20 Claims, 13 Drawing Sheets

DISPLAY DEVICE AND METHOD OF MANUFACTURING THE SAME

CROSS-REFERENCE TO RELATED APPLICATION

This application claims priority from and the benefit of Korean Patent Application No. 10-2016-0054740 filed on May 3, 2016, which is hereby incorporated by reference for all purposes as if fully set forth herein.

BACKGROUND

Field

Exemplary embodiments relate generally to a display device and a method of manufacturing the same and, more particularly, to a display device and a method of manufacturing the same that may reduce the formation of dark portions in pixels by facilitating balanced driving of liquid crystals.

Discussion of the Background

With the development of multimedia, the importance of display devices is increasing. Accordingly, various types of display devices such as liquid crystal displays (LCDs) and organic light-emitting displays (OLEDs) are being used.

In particular, LCDs are one of the most widely used types of flat panel displays. Generally, an LCD includes a pair of substrates having field generating electrodes, such as pixel electrodes and a common electrode, and a liquid crystal layer interposed between the two substrates. In an LCD, voltages are applied to field generating electrodes to generate an electric field in a liquid crystal layer. Accordingly, the direction of liquid crystal molecules of the liquid crystal layer is determined, and polarization of incident light is controlled. As a result, a desired image is displayed on the LCD.

An LCD typically includes a display area in which an image is displayed and a non-display area in which various signal lines are disposed, so as to enable the display area to display an image.

In addition, a plurality of pixels are formed in the display area. The pixels receive light from a backlight and emit light of a particular wavelength. To display a desired image, a display device may block generation of unintended light by forming a black matrix therein, which may have a different structure and shape in each display device.

The above information disclosed in this Background section is only for enhancement of understanding of the background of the inventive concept, and, therefore, it may contain information that does not form the prior art that is already known in this country to a person of ordinary skill in the art.

SUMMARY

Display devices constructed according to the principles of the invention reduce the formation of dark portions in a pixel.

Exemplary embodiments of the invention provide display devices and method for manufacturing the same may reduce the formation of dark portions by maintaining the balance in driving liquid crystals in each pixel.

Additional aspects will be set forth in the detailed description which follows, and, in part, will be apparent from the disclosure, or may be learned by practice of the inventive concept.

According to an exemplary embodiment, a display device includes a first substrate, a first pixel and a second pixel disposed adjacent to each other on the first substrate, and a pixel electrode disposed in each of the first and second pixels, each pixel electrode including a first stem extending in a first direction between two first end portions, a second stem intersecting the first stem and extending in a second direction different from the first direction between two second end portions, and an intersection disposed where the first stem and the second stem meet, in which the first and second end portions define at least a portion of an outer extent of a pixel area in each pixel, and a first distance from a center of the pixel area of the first pixel to the intersection of the first pixel is different from a second distance from a center of the pixel area of the second pixel to the intersection of the second pixel The second distance may be greater than the first distance.

The center of the pixel area of the first pixel and the intersection of the first pixel may overlap each other.

The display device may further include a black matrix partially covering the second pixel, in which the black matrix may does not overlap the intersection of the second pixel.

The display device may further include a second substrate facing the first substrate, in which the black matrix is disposed on the second substrate.

The black matrix may be disposed on the first substrate.

A boundary line of the black matrix may traverse the second pixel.

The boundary line may be a curve having a first curvature.

The boundary line may be a straight line having a first slope.

The display device may further include a third pixel disposed adjacent to the second pixel including a first stem extending in the first direction, a second stem extending in the second direction, and an intersection disposed where the first stem and the second stem meet, in which a third distance from a center of the pixel area of the third pixel to the intersection of the third pixel is greater than the second distance.

According to an exemplary embodiment, a display device includes a first substrate, a first pixel and a second pixel disposed adjacent to each other on the first substrate, and a pixel electrode disposed in each of the first and second pixels, each pixel electrode including a first stem extending in a first direction between two first end portions, a second stem intersecting the first stem and extending in a second direction different from the first direction between two second end portions, and an intersection disposed where the first stem and the second stem meet, in which the first and second end portions define at least a portion of an outer extent of a pixel area in each pixel, the first stem and the second stem divide the pixel area of each of the first and second pixels into a plurality of domains, and the first pixel has a different number of domains than the number of domains in the second pixel.

The pixel area of the first pixel may include four domains and the pixel area of the second pixel comprises two domains.

The display device may further include a third pixel disposed adjacent to the second pixel and includes a first stem extending in the first direction, a second stem extending in the second direction, and an intersection disposed where first stem and the second stem meet, in which the third pixel may include one domain.

The display device may further include a black matrix partially covering the second pixel and the third pixel, in which an area of the second pixel not covered by the black matrix is greater than an area of the third pixel not covered by the black matrix.

The intersection of the first pixel may be disposed at a center of the pixel area of the first pixel, the intersection of the second pixel may be disposed at a side of the pixel area of the second pixel, and the intersection of the third pixel may be disposed at a corner of a pixel area of the third pixel.

The display device may further include branches disposed in the domains and extending diagonally from the first stem and the second stem.

An aperture ratio of the second pixel may be greater than that of the third pixel and less than that of the first pixel.

According to an exemplary embodiment, a display device includes a substrate, a first pixel and a second pixel disposed adjacent to each other on the substrate, and a pixel electrode disposed in each of the first and second pixels, each pixel electrode including intersecting stems that divide the corresponding pixel into a plurality of domains, in which an aperture ratio of the first pixel is greater than that of the second pixel, and the number of domains disposed in the first pixel is greater than that of the second pixel.

The display device may further include a black matrix, in which the black matrix overlaps a greater area of the second pixel than the first pixel.

According to an exemplary embodiment, a display device includes a first substrate, a first pixel and a second pixel disposed adjacent to each other on the first substrate, and a pixel electrode disposed in each of the first pixel and the second pixel, each pixel electrode including a first stem extending in a first direction, a second stem intersecting the first stem and extending in a second direction different from the first direction, and an intersection disposed where the first stem and the second stem meet, and a black matrix disposed on the first substrate and partially covering the second pixel, in which the black matrix does not overlap the intersection of the second pixel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
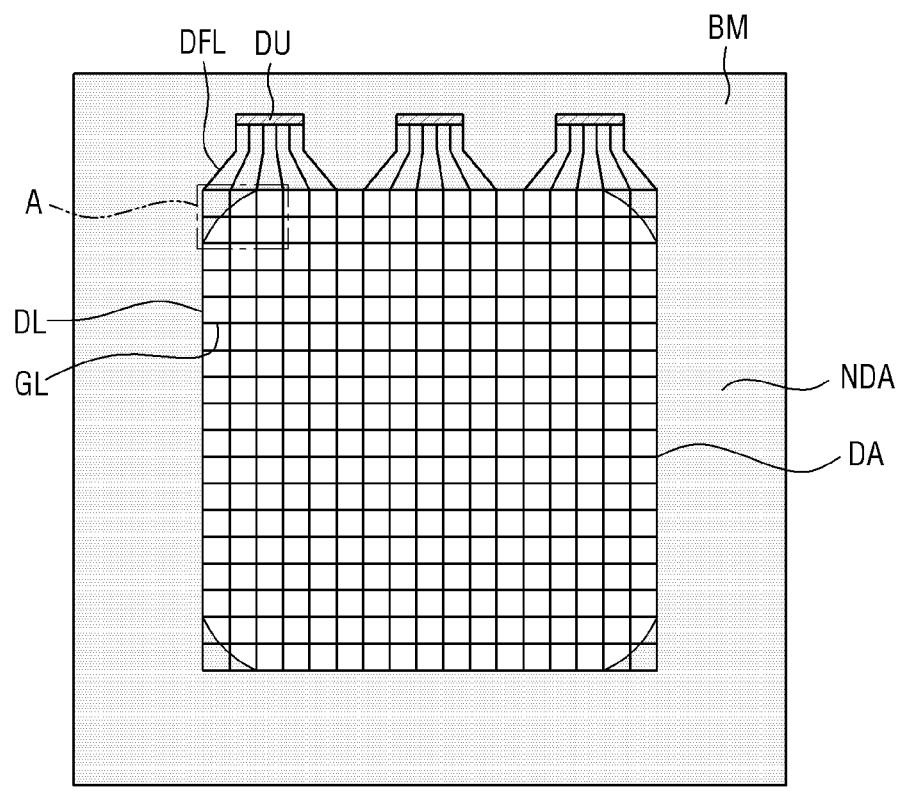
FIG. 1 is a layout view of a display device constructed according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
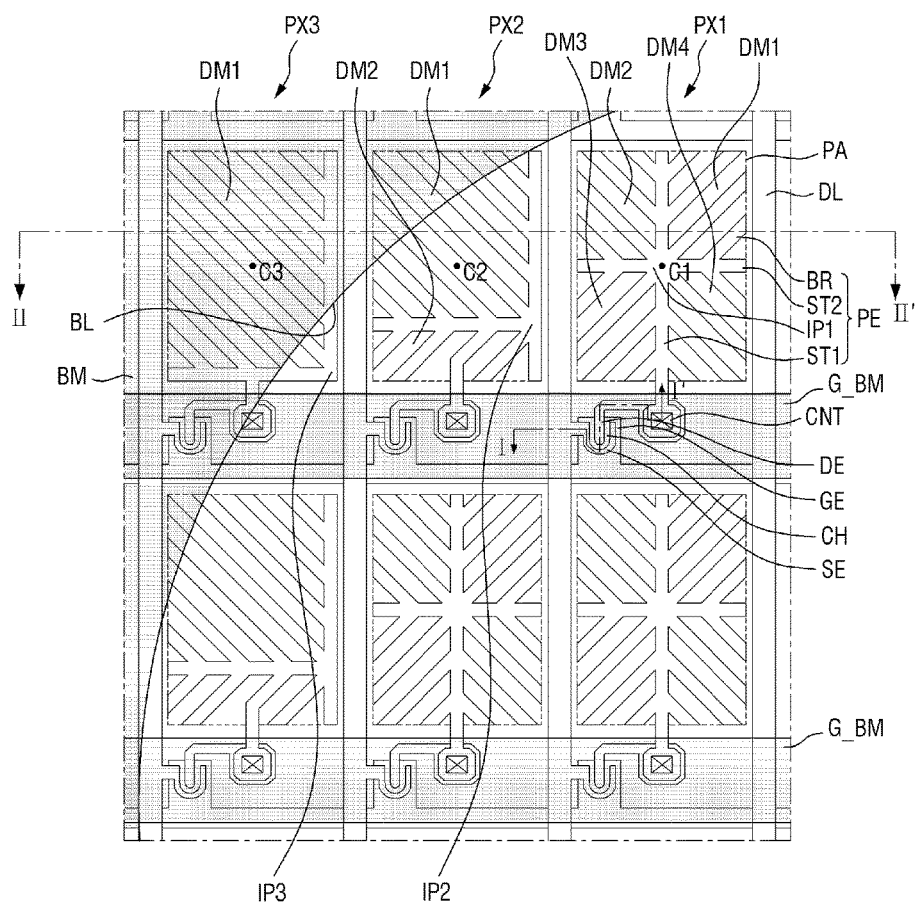
FIG. 2 is an enlarged view of an area 'A' of the display device of FIG. 1.
Figure 3:
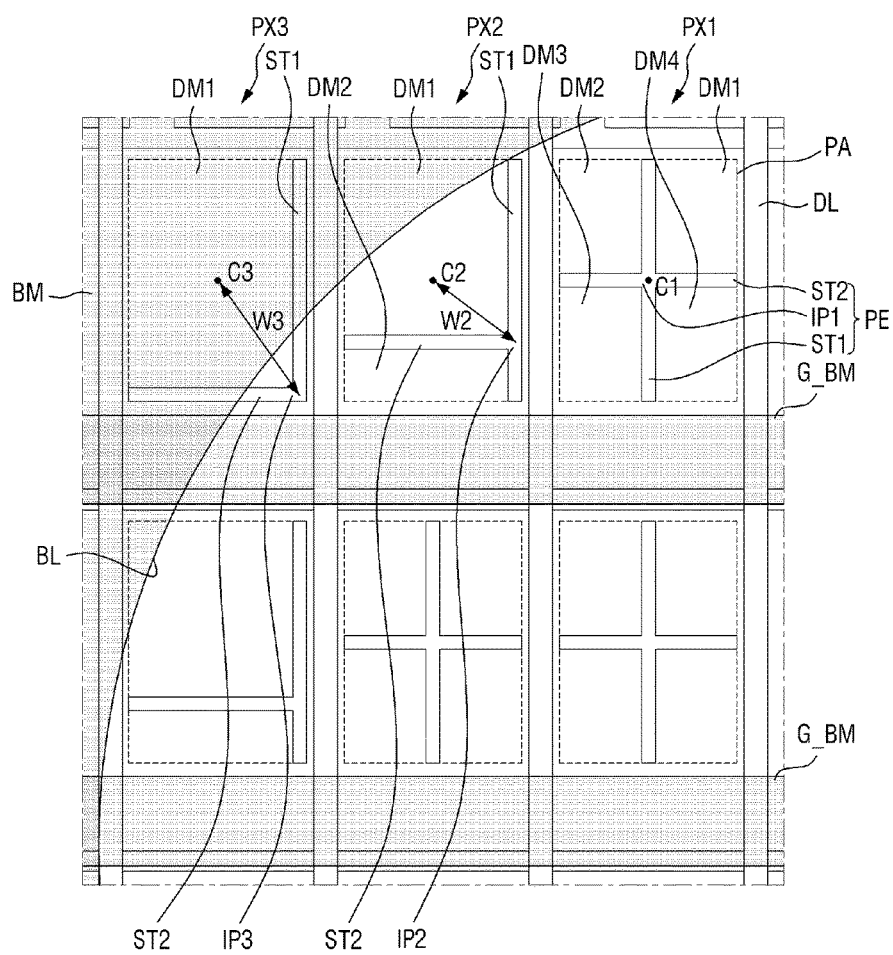
FIG. 3 is a layout view of FIG. 2.
Figure 4:
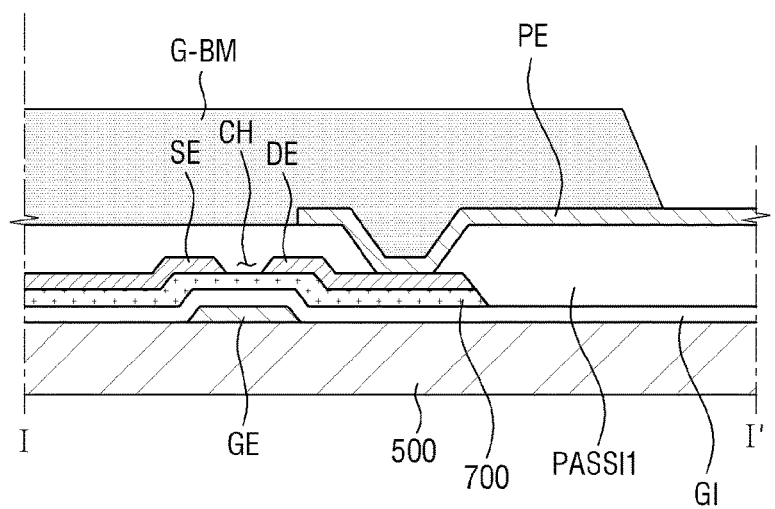
FIG. 4 is a cross-sectional view taken along line I-I' of the area 'A' of FIG. 2.
Figure 5:
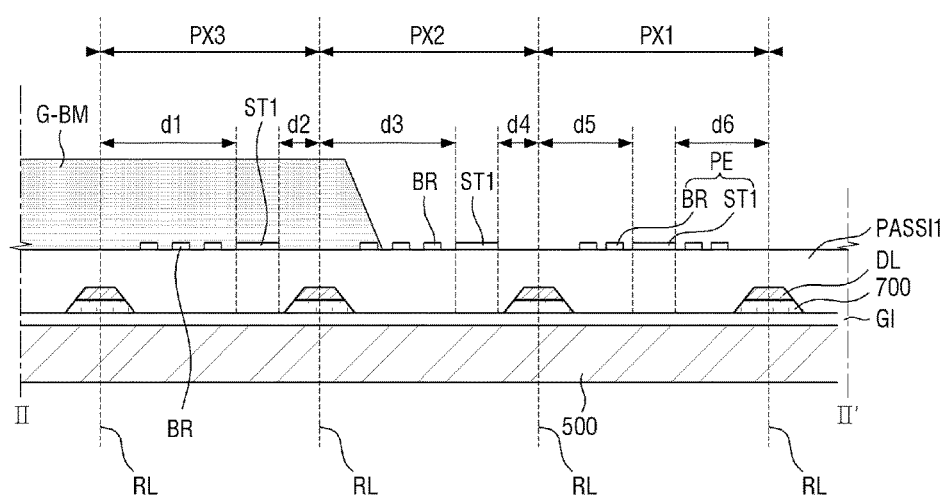
FIG. 5 is a cross-sectional view taken along line II-II' of the area 'A' of FIG. 2.

FIG. 1 is a layout view of a display device according to an exemplary embodiment. FIG. 2 is an enlarged view of an area 'A' of FIG. 1. FIG. 3 is a layout view omitting some components of FIG. 2. FIG. 4 is a cross-sectional view taken along line I-I' of the area 'A' of FIG. 2. FIG. 5 is a cross-sectional view taken along line II-II' of the area 'A' of FIG. 2.

Referring to FIGS. 1 through 5, the display device according to exemplary embodiments includes a first substrate 500, a first pixel PX1 and a second pixel PX2 disposed on the first substrate 500 to be adjacent to each other, and a pixel electrode PE disposed in each of the first pixel PX1 and the second pixel PX2. The pixel electrode PE includes a first stem ST1 extending in a first direction, a second stem ST2 extending in a second direction different from the first direction, and an intersection IP1 or IP2 formed in intersecting portions of the first stem ST1 and the second stem ST2.

Referring to FIG. 1, the first substrate 500 may include a material having heat-resisting and light-transmitting properties. The first substrate 500 may be made of, but not limited to, transparent glass or plastic. A display area DA and a non-display area NDA may be disposed in the first substrate 500.

The display area DA is an area of the display device in which an image is displayed, and the non-display area NDA is an area in which various signal lines are disposed to enable the display area DA to display an image.

In the non-display area NDA, data drivers DU that provide data signals to data lines DL and data fan-out lines DFL that deliver signals received from the data drivers DU to the data lines DL may be disposed.

In the display area DA, pixels defined at intersections of data lines DL and gate lines GL may be disposed. More particularly, FIG. 2 is an enlarged view of pixels disposed in area 'A' of the display area DA of FIG. 1.

A black matrix BM may be disposed on the first substrate 500, which may block light. The black matrix BM may include a black matrix disposed on the non-display area NDA and a black matrix disposed on the display area DA. Specifically, the black matrix BM may block light emitted from a backlight and prevent leakage of light in areas other than the display area DA.

In the exemplary embodiments, the black matrix BM of the non-display area NDA may partially cover corners of the display area DA. Accordingly, some of the pixels disposed at the corners of the display area DA may be at least partially covered by the black matrix BM of the non-display area NDA. This will be described in detail later with reference to FIGS. 2 and 3.

FIG. 2 is an enlarged view of the area 'A' of FIG. 1. FIG. 3 is a layout view omitting some components of FIG. 2. Referring to FIGS. 2 and 3, the display device according to the exemplary embodiments may include pixels disposed adjacent to each other. As described above, the pixels may be defined by the gate lines GL and the data lines DL. More particularly, one pixel may be a space formed by the intersection the gate lines GL and the data lines DL.

In one pixel, a gate electrode GE, a source electrode SE, a drain electrode DE, and a pixel electrode PE may be disposed. The gate electrode GE, the source electrode SE, and the drain electrode DE will be described in detail later with reference to FIG. 4.

In one pixel, a gate black matrix G_BM may be disposed, which covers the gate electrode GE, the source electrode SE, and the drain electrode DE. The gate black matrix G_BM may extend along the gate lines GL and block light emitted from the backlight or prevent leakage of light.

The gate black matrix G_BM may include substantially the same material as that in the black matrix BM described above, and may be formed at the same time when the black matrix BM is formed in the same process. Alternatively, the gate black matrix G_BM and the black matrix BM may be formed independently using different materials in separate processes.

A pixel area PA may be defined in one pixel. The pixel area PA may be a portion of the pixel, which excludes a portion covered by the gate black matrix G_BM. The pixel area PA may be an area occupied by an outer circumference of the pixel electrode PE. Hereinafter, configurations of the pixel electrode PE in each pixel constructed according to the principles of the invention will be described with reference to the pixel area PA.

The pixel electrode PE may include a first stem ST1 extending in the first direction, a second stem ST2 extending in the second direction different from the first direction, an intersection IP1, IP2, or IP3 of the first stem ST1 and the second stem ST2, and branches BR extending diagonally from the first stem ST1 and the second stem ST2. According to exemplary embodiments, the first stem ST1 may extend in the first direction between two first end portions and the second stem ST2 may extend in the second direction between two second end portions. In this manner, the two first end portions and the two second end portions may define at least a portion of an outer extent of a pixel area PA in each pixel.

According to an exemplary embodiment, the first direction may be a direction parallel to the data lines DL, and the second direction may be a direction parallel to the gate lines GL. In this case, the first stem ST1 and the second stem ST2 may perpendicularly intersect each other at the intersection IP1, IP2, or IP3.

Hereinafter, the pixels will be referred to as a first pixel PX1, a second pixel PX2, and a third pixel PX3 sequentially from the one disposed at an upper right corner of FIG. 2.

The first pixel PX1 will hereinafter be described.

The first stem ST1 and the second stem ST2 of the pixel electrode PE disposed in the first pixel PX1 may intersect each other at a center C1 of a pixel area PA the first pixel PX1. As used herein, the center of each pixel area PA may refer to a geometric center of each pixel area PA, and may be used for describing the following configuration.

The intersection IP1 of the first pixel PX1 may overlap the center C1 of the pixel area PA of the first pixel PX1. More particularly, a distance between the center C1 of the pixel area PA of the first pixel PX1 and the intersection IP1 may be zero.

The first stem ST1 and the second stem ST2 of the first pixel PX1 may divide the pixel area PA of the first pixel PX1 into four domains. Specifically, when the first stem ST1 and the second stem ST2 intersect each other in a cross (+) shape, they may divide the pixel area PA into four domains.

More particularly, assuming that the intersection IP1 of the first pixel PX1 is the origin, and that the first stem ST1 is the y-axis and the second stem ST2 is the x-axis, the first pixel PX1 may include a first domain DM1 corresponding to a first quadrant, a second domain DM2 corresponding to a second quadrant, a third domain DM3 corresponding to a third quadrant, and a fourth domain DM4 corresponding to a fourth quadrant.

The branches BR may be disposed in the first, second, third, and fourth domains DM1, DM2, DM3, and DM4. The branches BR may extend diagonally from edges of the pixel area PA toward the intersection IP1. More particularly, the branches BR may extend from the first stem ST1 and the second stem ST2 toward the edges of the pixel area PA.

In the first pixel PX1, the first to fourth domains DM1 to DM4 may have substantially the same size or area. When the first to fourth domains DM1 to DM4 have substantially the same area with respect to the intersection IP1 of the pixel area PA of the first pixel PX1, generation of a dark portion of the pixel area PA may be minimized.

Next, the second pixel PX2 and the third pixel PX3 will be described.

The second pixel PX2 may be disposed adjacent to the first pixel PX1. The second pixel PX2 may include a pixel area PA.

The pixel area PA of the second pixel PX2 may be at least partially covered by the black matrix BM of the non-display area NDA. More particularly, a boundary line BL of the black matrix BM of the non-display area NDA may traverse the pixel area PA of the second pixel PX2. In this case, if a relative aperture ratio of the first pixel PX1 is one, a relative aperture ratio of the second pixel PX2 may be less than one due to the black matrix BM of the non-display area NDA. As used herein, the relative aperture ratio may refer to the degree to which the pixel area of each pixel is exposed. In other words, if the relative aperture ratio of the pixel area PA of the first pixel PX1 not covered by the black matrix BM of the non-display area NDA is one, the relative aperture ratio of each of the second pixel PX2 and the third pixel PX3 may be less than one.

The intersection IP2 of the second pixel PX2 may be disposed in a portion of the pixel area PA of the second pixel PX2 that is not covered by the black matrix BM of the non-display area NDA. In the exemplary embodiments, the first stem ST1 and the second stem ST2 may intersect each other at one side of the pixel area PA. In this case, the pixel area PA may be divided into two domains by the first stem ST1 and the second stem ST2. More particularly, the pixel area PA of the second pixel PX2 may include a first domain DM1 disposed above the second stem ST2 and a second domain DM2 disposed below the second stem ST2.

The branches BR may be disposed in the first domain DM1 and the second domain DM2. The branches BR may extend diagonally from the first stem ST1 and the second stem ST2 toward edges of the pixel area PA.

The third pixel PX3 may be disposed adjacent to the second pixel PX2. The third pixel PX3 may include a pixel area PA.

In the exemplary embodiments, the third pixel PX3 may be a pixel disposed at an outermost corner of the display area DA. The pixel area PA of the third pixel PX3 may be at least partially covered by the black matrix BM of the non-display area NDA. When the black matrix BM of the non-display area NDA partially covers the pixel area PA of the third pixel PX3, the boundary line BL of the black matrix BM of the non-display area NDA may traverse the pixel area PA of the third pixel PX3.

In the exemplary embodiments, the boundary line BL of the black matrix BM of the non-display area NDA may have a curved shape. More particularly, the boundary line BL of the black matrix BM of the non-display area NDA may extend with a specified curvature.

In addition, in the exemplary embodiments, the relative aperture ratio of the third pixel PX3 may be less than that of the second pixel PX2. More particularly, a portion of the pixel area PA of the third pixel PX3 not covered by the black matrix BM of the non-display area NDA may be smaller in area than a portion of the pixel area PA of the second pixel PX2 not covered by the black matrix BM of the non-display area NDA.

The intersection IP3 of the third pixel PX3 may be disposed in the portion of the pixel area PA of the third pixel PX3 not covered by the black matrix BM of the non-display area NDA. In the exemplary embodiments, the first stem ST1 and the second stem ST2 may intersect each other at a corner of the pixel area PA. More particularly, the intersection IP3 may be disposed at a corner of the pixel area PA. When the intersection IP3 is disposed at the corner of the pixel area PA, the first stem ST1 and the second stem ST2 may define a single domain, such as the first domain DM1. In particular, the pixel area PA of the third pixel PX3 may include only one domain.

The branches BR may be disposed in the first domain DM1 of the third pixel PX3. The branches BR may extend diagonally from the first stem ST1 and the second stem ST2 toward edges of the pixel area PA.

Referring back to FIG. 2, the pixels may be divided into a pixel having a pixel area PA overlapped by the black matrix BM of the non-display area NDA, and a pixel having a pixel area PA not overlapped by the black matrix BM of the non-display area NDA. The pixel having a pixel area PA not overlapped by the black matrix BM of the non-display area NDA may be substantially identical to the first pixel PX1 described above. More particularly, the pixel having a pixel area PA not overlapped by the black matrix BM of the non-display area NDA may include four domains each having substantially identical areas.

On the other hand, the pixel having a pixel area PA partially overlapped by the black matrix BM of the non-display area NDA may be the second pixel PX2 or the third pixel PX3. In particular, these pixels may include two domains or only one domain.

In FIG. 2, out of six pixels, three pixels are partially overlapped by the black matrix BM of the non-display area NDA, and the other three pixels are not overlapped by the black matrix BM of the non-display area NDA. However, the number of pixels overlapped by the black matrix BM is not limited to the above.

The relationship between the center of the pixel area PA and the intersection IP1, IP2, or IP3 will now be described with reference to FIG. 3.

Referring to FIG. 3, in the first pixel PX1, the intersection IP1 and the center C1 of the pixel area PA may overlap each other. In this case, the distance between the intersection IP1 and the center C1 of the pixel area PA may be zero.

In the second pixel PX2, the distance between the intersection IP2 of the second pixel PX2 and a center C2 of the pixel area PA may be a second distance W2. In the third pixel PX3, the distance between the intersection IP3 of the third pixel PX3 and a center C3 of the pixel area PA may be a third distance W3. In the exemplary embodiments, the second distance W2 and the third distance W3 may be different from each other. Specifically, the third distance W3 may be greater than the second distance W2.

As described above, the relative aperture ratio of the second pixel PX2 is greater than that of the third pixel PX3, and the difference between the second distance W2 and the third distance W3 may be associated with the area of an uncovered region by the black matrix BM of the non-display area NDA. More particularly, the smaller the area of the uncovered region, the greater the distance may be from the center of the pixel area to the intersection.

When the pixel area PA is not covered by the black matrix BM of the non-display area NDA as in the first pixel PX1, liquid crystals may be driven in a balanced manner by four domains, thereby minimizing the formation of dark portions. However, when the pixel area PA is partially covered by the black matrix BM of the non-display area NDA as in the second pixel PX2 and the third pixel PX3, the liquid crystals may be driven in an unbalanced manner, thereby increasing the dark portions. Therefore, the intersection IP2 or IP3 may be shifted from the center C2 or C3 of the pixel area PA by a predetermined distance, as in the second pixel PX2 and the third pixel PX3. In this manner, the imbalance in the liquid crystals may be reduced, and thus, the formation of the dark portions in a pixel may be minimized.

According to exemplary embodiments, one pixel may include a plurality of pixel electrodes, which may have the same or different shapes. For example, the pixel may include two pixel electrodes, each pixel electrode having a first stem, a second stem intersecting the first stem, and an intersection where the first and second stems meet. In this manner, the pixel may include two pixel areas PA therein, and each pixel area PA may have, for example, a low intersection and a high intersection, respectively. In this case, the inventive concept discussed above may be applied to each pixel area PA of the first, second, and third pixels PX1, PX2, and PX3, that correspond to each other. More particularly, when each of the first, second, and third pixels PX1, PX2, and PX3 have two pixel areas PA therein, a high intersection of the first pixel PX1 may overlap a center of the corresponding pixel area, and a high intersection of the second pixel PX2 and a high intersection of the third pixel area PX3, which correspond to the high intersection of the first pixel PX1, may each be shifted from the center of corresponding pixel area, to minimize formation of the dark portions therein. Similarly, a low intersection of the first pixel PX1 may overlap a center of the corresponding pixel area, and a low intersection of the second pixel PX2 and a low intersection of the third pixel area PX3, which correspond to the low intersection of the first pixel PX1, may each be shifted from the center of corresponding pixel area.

FIG. 4 is a cross-sectional view taken along line I-I' of FIG. 2. Referring to FIG. 4, a gate wiring layer GL and GE may be disposed on the first substrate 500. The gate wiring layer GL and GE may include a gate line GL, which receives a driving signal, and a gate electrode GE, which protrudes from the gate line GL. The gate line GL may extend in a first direction. The gate electrode GE may form three terminals of a thin-film transistor (TFT) together with a source electrode SE and a drain electrode DE, which will be described later.

The gate wiring layer GL and GE may include at least one of aluminum (Al)-based metal such as an aluminum alloy, silver (Ag)-based metal such as a silver alloy, copper (Cu)-based metal such as a copper alloy, molybdenum (Mo)-based metal such as a molybdenum alloy, chrome (Cr), titanium (Ti), and tantalum (Ta). The gate wiring layer GL and GE may also include a metallic or polymer material capable of realizing a desired display device.

The gate wiring layer GL and GE may have a single layer structure. The gate wiring layer GL and GE may alternatively have a multilayer structure, such as a double layer or a triple or more layer.

A gate insulating layer GI may be disposed on the gate wiring layer GL and GE. The gate insulating layer GI may cover the gate wiring layer GL and GE, and may be disposed on the entire surface of the first substrate 500.

The gate insulating layer GI may include at least one of an inorganic insulating material, such as silicon oxide ($SiO_x$) or silicon nitride ($SiN_x$), and an organic insulating material, such as benzocyclobutene (BCB), an acrylic material, or polyimide.

A semiconductor pattern layer 700 may be disposed on the gate insulating layer GI. The semiconductor pattern layer 700 may include amorphous silicon or polycrystalline silicon. The semiconductor pattern layer 700 may alternatively include an oxide semiconductor.

The semiconductor pattern layer 700 may have various shapes such as an island shape and a linear shape. When the semiconductor pattern layer 700 is linearly shaped, it may be disposed under a data line DL and extend onto the gate electrode GE.

According to an exemplary embodiment, the semiconductor pattern layer 700 may be patterned to have substantially the same shape as a data wiring layer DL, SE, and DE in all areas excluding a channel region CH. More particularly, the semiconductor pattern layer 700 may overlap the data wiring layer DL, SE, and DE in all areas excluding the channel region CH.

The channel region CH may be disposed between the source electrode SE and the drain electrode DE opposing each other. The channel region CH may electrically connect the source electrode SE and the drain electrode DE, and the shape of the channel region CH may be varied.

An ohmic contact layer (not illustrated) heavily doped with an n-type impurity may be disposed on the semiconductor pattern layer 700. The ohmic contact layer may overlap the entire or a portion of the semiconductor pattern layer 700. However, when the semiconductor pattern layer 700 includes an oxide semiconductor, the ohmic contact layer may be omitted.

When the semiconductor pattern layer 700 is an oxide semiconductor, the semiconductor pattern layer may include zinc oxide (ZnO). Further, the semiconductor pattern layer 700 may be doped with one or more ions of gallium (Ga), indium (In), stannum (Sn), zirconium (Zr), hafnium (Hf), cadmium (Cd), silver (Ag), copper (Cu), germanium (Ge), gadolinium (Gd), titanium (Ti), and vanadium (V). For example, the semiconductor pattern layer 700 formed as an oxide semiconductor may include at least one of, for example, ZnO, ZnGaO, ZnInO, ZnSnO, GaInZnO, CdO, InO, GaO, SnO, AgO, CuO, GeO, GdO, HfO, TiZnO, InGaZnO, and InTiZnO.

The data wiring layer DL, SE, and DE may be disposed on the semiconductor pattern layer 700. The data wiring layer DL, SE, and DE includes the data line DL, the source electrode SE, and the drain electrode DE.

The data line DL may extend in a second direction and intersect the gate line GL. The source electrode SE may branch off from the data line DL and extend onto the semiconductor pattern layer 700.

The drain electrode DE may be separated from the source electrode SE and may be disposed on the semiconductor pattern layer 700 to face the source electrode SE with respect to the gate electrode GE or the channel region CH. The drain electrode DE may contact, and thus, may be electrically connected to, a pixel electrode PE, which will be described later.

The data wiring layer DL, SE, and DE may have a single layer structure or a multilayer structure including at least one of nickel (Ni), cobalt (Co), titanium (Ti), silver (Ag), copper (Cu), molybdenum (Mo), aluminum (Al), beryllium (Be), niobium (Nb), gold (Au), iron (Fe), selenium (Se), and tantalum (Ta). In addition, the data wiring layer DL, SE, and DE may be an alloy of any one of the above metals and one or more elements of titanium (Ti), zirconium (Zr), tungsten (W), tantalum (Ta), niobium (Nb), platinum (Pt), hafnium (Hf), oxygen (O), and nitrogen (N).

In FIG. 2, one TFT is disposed in one pixel. It is contemplated that, however, the number of TFTs disposed in one pixel may vary.

A first passivation layer PASSI1 may be disposed on the data wiring layer DL, SE, and DE, and the semiconductor pattern layer 700. The first passivation layer PASSI1 may include an inorganic insulating material or an organic insulating material.

The first passivation layer PASSI1 may include a contact hole CNT, which exposes at least a portion of the drain electrode DE.

The pixel electrode PE may be disposed on the first passivation layer PASSI1. The pixel electrode PE may be electrically connected to the drain electrode DE via the contact hole CNT.

In an exemplary embodiment, the pixel electrode PE may include a transparent conductor, such as indium tin oxide (ITO) or indium zinc oxide (IZO), or a reflective conductor such as aluminum.

The distance relationship between adjacent data lines DL and the first stem ST of each pixel will now be described with reference to FIG. 5.

As used herein, a virtual line that passes through the center of a data line DL may be referred to as a reference line RL. In the following description, the distance from a data line DL to the reference line RL may refer to a distance between an end of the first stem ST1 and the reference line RL.

In the first pixel PX1, a distance d5 between a data line DL and the first stem ST1 may be substantially equal to a distance d6 between adjacent data line DL and the first stem ST1. This may be because the first stem ST1 passes through the center C1 of the pixel area PA of the first pixel PX1.

In the second pixel PX2, a distance d3 between a data line DL and the first stem ST1 may be different from a distance d4 between adjacent data line DL and the first stem ST1. Specifically, the distance d3 between the former data line DL and the first stem ST1 may be greater than the distance d4 between the latter data line DL and the first stem ST1. This may be because the first stem ST1 extends along one of the sides of the pixel area PA in the second pixel PX2.

In the third pixel PX3, a distance d1 between a data line DL and the first stem ST1 may be different from a distance d2 between adjacent data line DL and the first stem ST1. Specifically, the distance d1 between the former data line DL and the first stem ST1 may be greater than the distance d2 between the latter data line DL and the first stem ST1. This may be because the first stem ST1 extends along one of the sides of the pixel area PA in the third pixel PX3.

In the exemplary embodiments, d1 and d3 may be equal. More particularly, while the intersections IP2 and IP3 are located at different positions in the second pixel PX2 and the third pixel PX3 (see FIG. 2 or 3), the first stems ST1 may be located at substantially the same position in the corresponding pixel. When positions of the first stems ST1 in pixel areas of the second pixel PX2 and the third pixel PX3 are substantially the same, d1 and d3 may be substantially the same.

As described above, the black matrix BM of the non-display area NDA may partially cover the second pixel PX2 and the third pixel PX3. The pixel electrode PE of each of the second pixel PX2 and the third pixel PX3 may directly contact the black matrix BM of the non-display area NDA. According to an exemplary embodiment, however, at least one or more intermediate layers may be disposed between the pixel electrode PE and the black matrix BM of the display area DA or the non-display area NDA.

Hereinafter, display devices according to exemplary embodiments will be described. In the following exemplary embodiments, components substantially identical to those described above with reference to FIG. 1 to FIG. 5 are indicated by like reference numerals, and thus, repeated description of the substantially identical components will be omitted.

Figure 6:
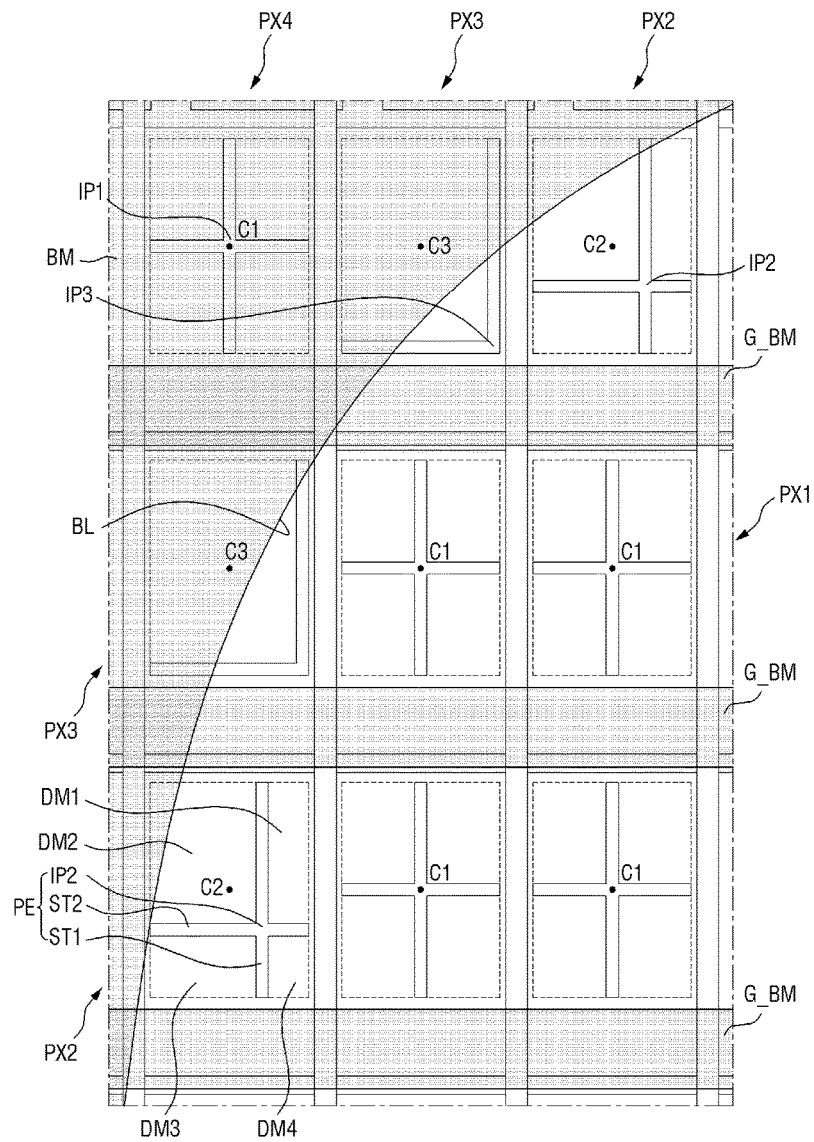
FIG. 6 is a layout view of a display device constructed according to an exemplary embodiment.

FIG. 6 is a layout view of a display device according to an exemplary embodiment.

Referring to FIG. 6, the display device according to the exemplary embodiments is different from the display device illustrated with reference to FIG. 2, in that a pixel area PA includes a fourth pixel PX4 that is completely covered by a black matrix BM of the non-display area NDA.

In the exemplary embodiments, a pixel disposed at an outermost corner of a display area DA may be completely covered by the black matrix BM of the non-display area NDA. For ease of description, this pixel will be referred to as the fourth pixel PX4. The fourth pixel PX may have an aperture ratio of zero because it is completely covered by the black matrix BM of the non-display area NDA.

Therefore, the formation of dark portions may not be a problem in the fourth pixel PX. The shape of a pixel electrode PE of the fourth pixel PX may not be limited to a particular shape. In the exemplary embodiments, the pixel electrode PE of the fourth pixel PX4 may have substantially the same shape as that of a first pixel PX1 illustrated in FIG. 6. The pixel electrode PE of the fourth pixel PX4 may alternatively have the same shape as that of a second pixel PX2 or a third pixel PX3.

Referring to FIG. 6, in the exemplary embodiments, the second pixel PX2 may include four domains having different areas or sizes.

As described above, in a pixel partially covered by the black matrix BM of the non-display area NDA, an intersection IP2 or IP3 may be located in a portion of the pixel area PA which is not covered by the black matrix BM of the non-display area NDA.

In the exemplary embodiments, the intersection IP2 may be located at any position in the portion of the pixel area PA not covered by the black matrix BM of the non-display area NDA. In this case, the pixel area PA may be divided into four domains having different sizes by a first stem ST1 and a second stem ST2. More particularly, the second pixel PX2 may include first to fourth domains DM1, DM2, DM3, and DM4, and the four domains DM1 to DM4 may have different sizes.

According to an exemplary embodiment, the intersection IP2 may be disposed in a portion of the pixel area PA not covered by the black matrix BM of the non-display area NDA, such that each of the domains DM1 to DM4 formed by the first stem ST1 and the second stem ST2 may have substantially the same sizes within the pixel area PA not covered by the black matrix BM of the non-display area NDA.

The branches BR extending from the first stem ST1 and the second stem ST2 toward edges of the pixel area PA may be disposed in each of the first to fourth domains DM1 to DM4, as described above in the display device illustrated with reference to FIG. 1 to FIG. 5. In this case, the intersection IP2 may be separated from a center C2 of the pixel area PA by a predetermined distance. When the intersection IP2 is shifted from the center C2 of the pixel area PA by a predetermined distance, the imbalance in liquid crystal driving caused by the black matrix BM of the non-display area NDA may be corrected, and thus, the formation of the dark portions in the pixel area PA may be minimized.

Figure 7:
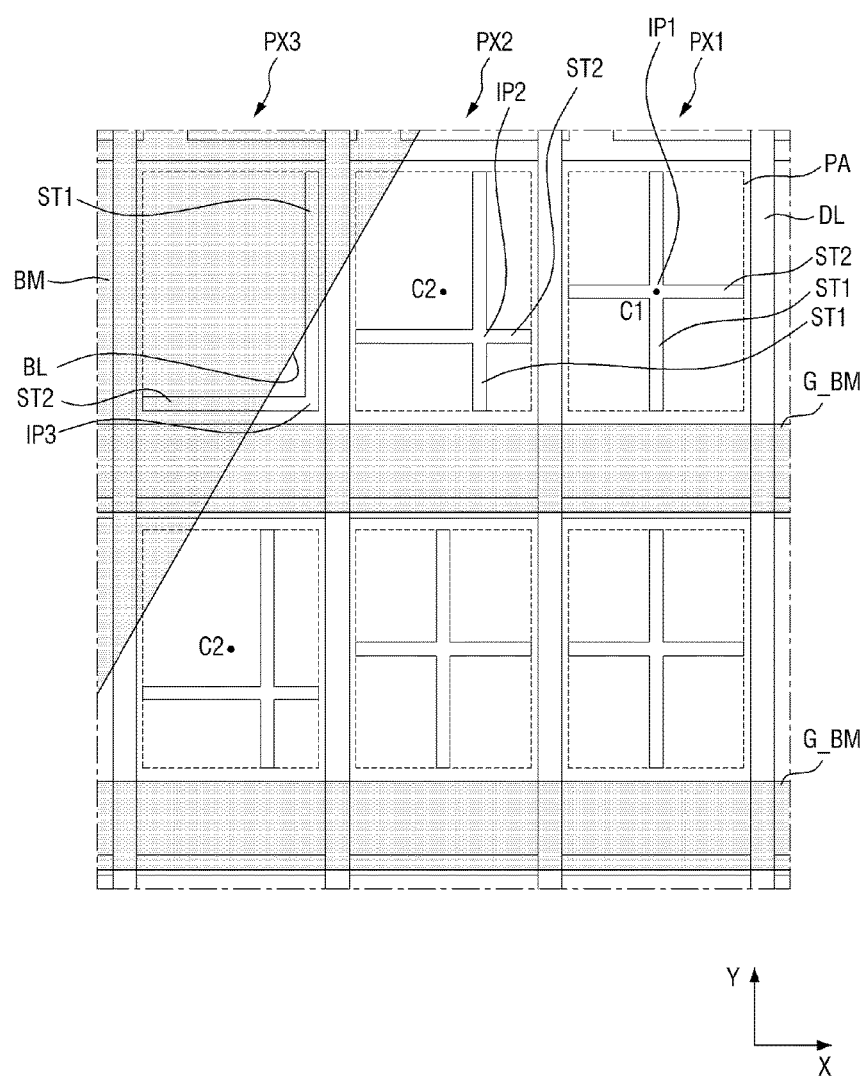
FIG. 7 is a partial layout view of a display device constructed according to an exemplary embodiment.

FIG. 7 is a partial layout view of a display device according to an exemplary embodiment.

Referring to FIG. 7, in the display device according to the exemplary embodiments, a boundary line BL of a black matrix BM of the non-display area NDA may be a straight line having a predetermined slope.

When the boundary line BL of the black matrix BM of the non-display area NDA is a straight line, a display area DA may be have a rectangular shape having corners cut off by the black matrix BM of the non-display area NDA, such as a chamfered square.

In the exemplary embodiments, the boundary line BL of the black matrix BM of the non-display area NDA and branches BR may have slopes of different signs. More particularly, in an x-y coordinate system of FIG. 7, the slope of the boundary line BL may have a positive number, and the slope of the intersecting branches BR with the boundary line BL may have a negative number.

Figure 8:
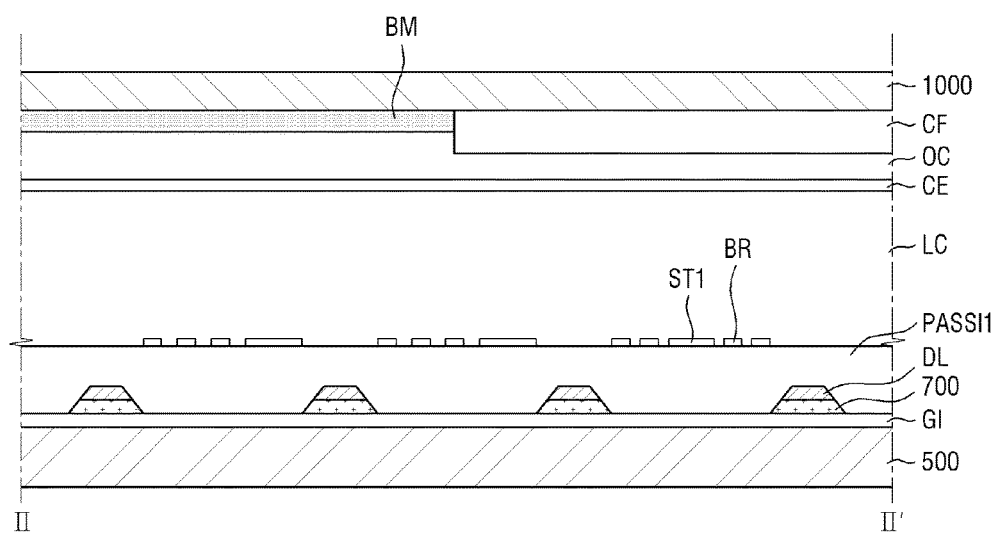
FIG. 8 is a cross-sectional view of a display device constructed according to an exemplary embodiment.

FIG. 8 is a cross-sectional view of a display device according to an exemplary embodiment.

Referring to FIG. 8, in the display device according to the exemplary embodiments, a black matrix BM may be disposed on a second substrate 1000.

In the exemplary embodiments, the second substrate 1000 may be placed to face a first substrate 500. The second substrate 1000 may include a material having heat-resisting and light-transmitting properties. The second substrate 1000 may be made of, but not limited to, transparent glass or plastic.

The black matrix BM and a color filter CF may be disposed on the second substrate 1000. The black matrix BM may block light incident from an external source and spreading of light within the display device. To this end, the black matrix BM may include photosensitive resin that includes a black pigment. The black matrix BM may alternatively include any material that has physical properties for blocking light incident from an external source.

The color filter CF may be disposed in a portion not covered by the black matrix BM, that is, a portion exposed by the black matrix BM. The color filter CF may convert a wavelength of light that passes through a liquid crystal layer LC, which will be described later.

As described above in the display devices illustrated with reference to FIG. 1 to FIG. 7, the black matrix BM of the non-display area NDA may at least partially overlap a pixel disposed at each corner of a display area DA among pixels disposed in the display area DA.

An overcoat layer OC may be disposed on the black matrix BM and the color filter CF. The overcoat layer OC may be formed on the entire surface of the second substrate 1000 to cover the black matrix BM and the color filter CF. In addition, the overcoat layer OC may function as a planarization layer.

A common electrode CE may be disposed on the overcoat layer OC. The common electrode CE may be an unpatterned, whole-surface electrode. A common voltage may be applied to the common electrode CE. When different voltages are applied to the common electrode CE and a pixel electrode PE, an electric field may be formed between the common electrode CE and the pixel electrode PE.

The liquid crystal layer LC including liquid crystal molecules may be disposed between the first substrate 500 and the second substrate 1000. The liquid crystal layer LC may be controlled by the electric field formed between the common electrode CE and the pixel electrode PE. The electric field may control the movement of liquid crystals of the liquid crystal layer LC, thereby controlling light for displaying an image.

Hereinafter, a method of manufacturing a display device according to an exemplary embodiment will be described. In the following exemplary embodiments, components substantially identical to those of the display devices described above are indicated by like reference numerals, and thus, repeated description of the substantially identical components will be omitted.

Figure 9:
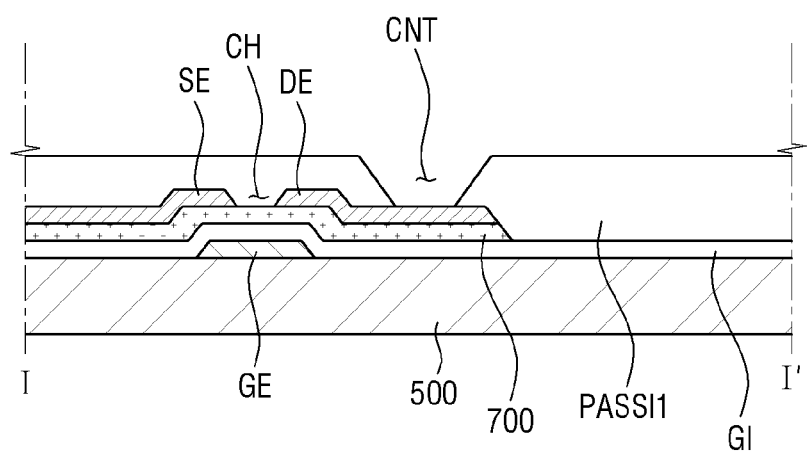
FIG. 9 is a cross-sectional view illustrating a method of manufacturing a display device according to an exemplary embodiment.
Figure 10:
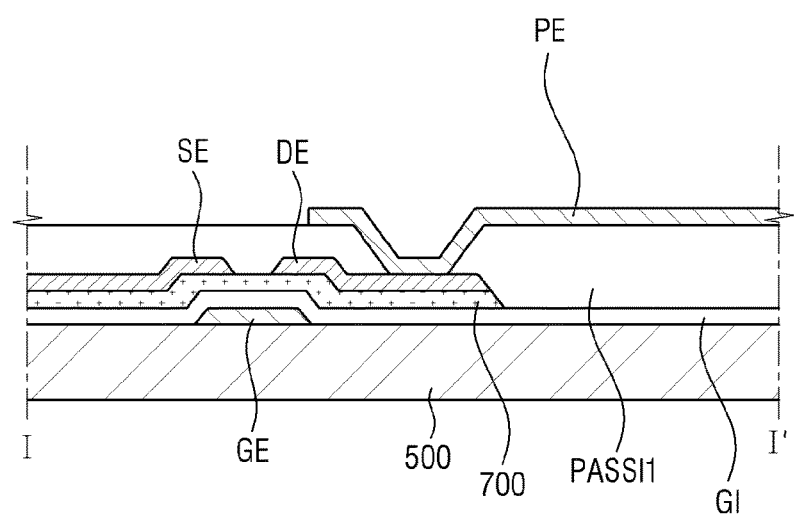
FIG. 10 is a cross-sectional view illustrating a method of manufacturing a display device according to an exemplary embodiment.
Figure 11:
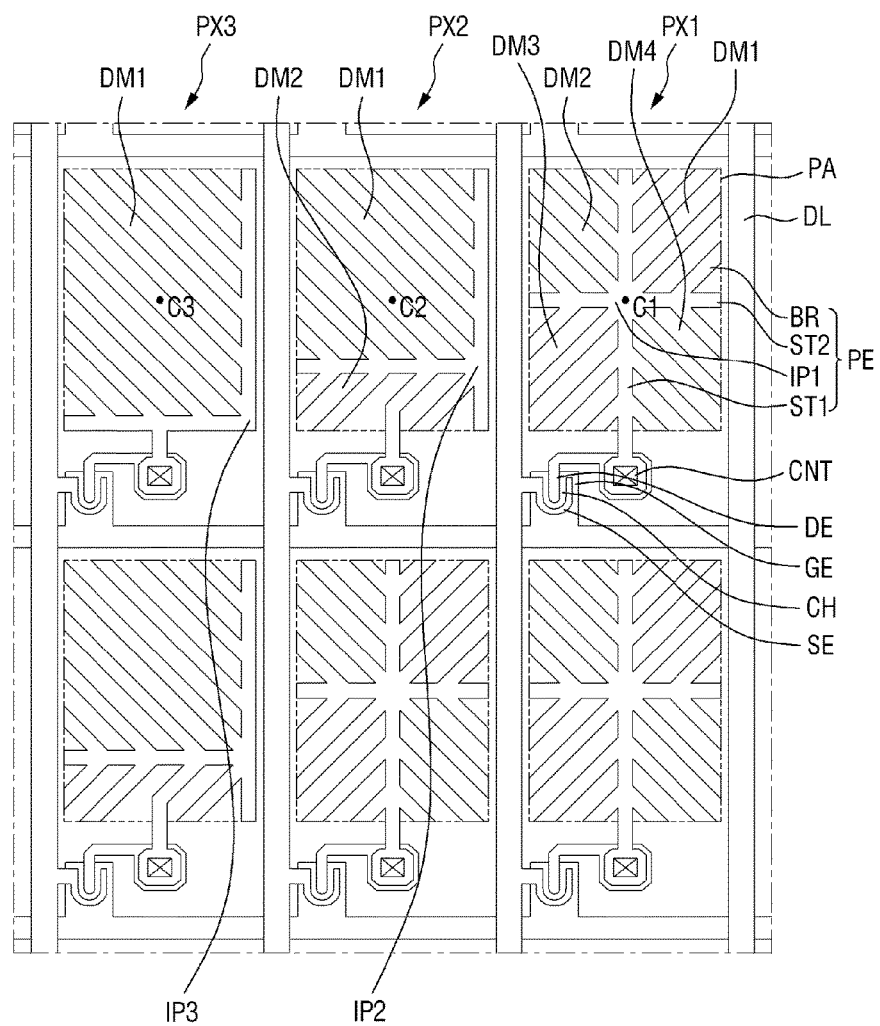
FIG. 11 is a layout view illustrating a method of manufacturing a display device according to an exemplary embodiment.
Figure 12:
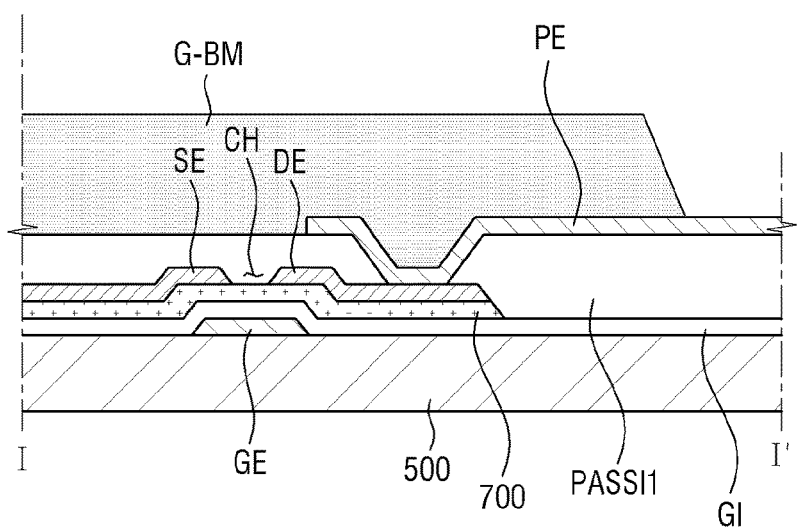
FIG. 12 is a cross-sectional view illustrating a method of manufacturing a display device according to an exemplary embodiment.
Figure 13:
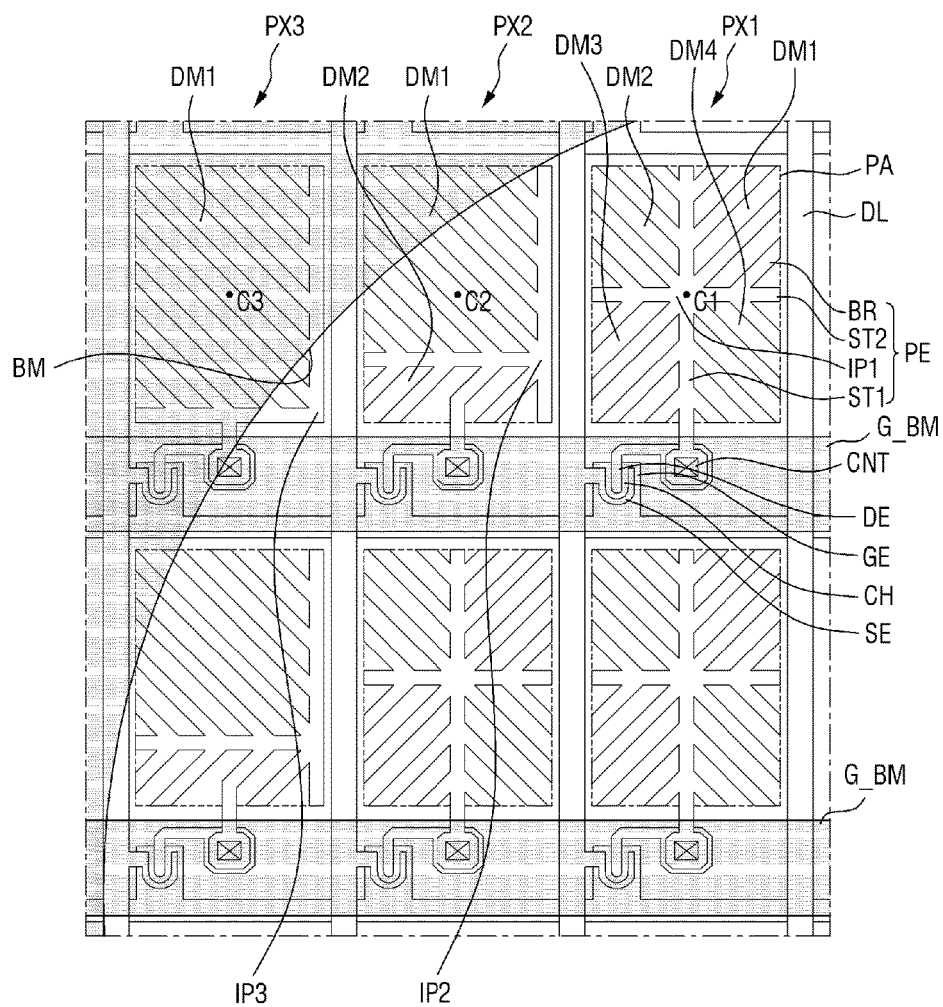
FIG. 13 is a layout view illustrating a method of manufacturing a display device according to an exemplary embodiment.

FIG. 9 is a cross-sectional view illustrating a method of manufacturing a display device according to an exemplary embodiment. FIG. 10 is a cross-sectional view illustrating the method of manufacturing a display device according to an exemplary embodiment. FIG. 11 is a layout view illustrating the method of manufacturing a display device according to an exemplary embodiment. FIG. 12 is a cross-sectional view illustrating the method of manufacturing a display device according to an exemplary embodiment. FIG. 13 is a layout view illustrating the method of manufacturing a display device according to an exemplary embodiment.

Referring to FIGS. 9 through 13, the method of manufacturing a display device according to an exemplary embodiment includes preparing a first substrate having a first pixel and a second pixel, and forming a pixel electrode in each of the first pixel and the second pixel. The pixel electrode includes a first stem extending in a first direction, a second stem extending in a second direction different from the first direction and intersecting the first stem, and an intersection where the first stem and the second stem meet.

First, referring to FIG. 9, a first substrate 500 may be prepared.

A gate electrode GE may be formed on the first substrate 500. The gate electrode GE may be formed by forming a conductive layer on the entire surface of the first substrate 500 and then etching the conductive layer. The structure and material of the gate electrode GE may be substantially the same as those of the gate electrode GE described above.

A gate insulating layer GI may be formed on the gate electrode GE. The gate insulating layer GI may be formed on the entire surface of the first substrate 500. The gate insulating layer GI may be formed by at least one of sputtering, chemical vapor deposition (CVD), and inkjet printing methods.

A semiconductor pattern layer 700 may be formed on the gate insulating layer GI. The semiconductor pattern layer 700 may be formed by forming a semiconductor layer on the entire surface of the first substrate 500 and then patterning the semiconductor layer. In the exemplary embodiments, the semiconductor pattern layer 700 may be patterned at the same time when patterning a data wiring layer DL, DE, and SE. Alternatively, the semiconductor pattern layer 700 and the data wiring layer DL, DE, and SE may be patterned independently in separate processes.

The data wiring layer, which includes a data line DL, a drain electrode DE, and a source electrode SE, may be formed on the semiconductor pattern layer 700. The specific structure and material of the data wiring layer DL, DE, and SE may be substantially the same as those of the data wiring layer DL, DE, and SE described above.

A first passivation layer PASSI1 may be formed on the data wiring layer DL, DE, and SE. A contact hole CNT may be formed in the first passivation layer PASSI1. The contact hole CNT may expose at least a portion of an upper surface of the drain electrode DE. As described above, pixels may be formed in the first substrate 500. The pixels may be defined by the gate lines GL and the data lines DL as described above.

Referring to FIGS. 10 and 11, a pixel electrode PE may be formed on the first substrate 500. As described above, the pixel electrode PE may include a first stem ST1 extending in the first direction, a second stem ST2 extending in the second direction different from the first direction and intersecting the first stem ST1, an intersection IP1 or IP2 of the first stem ST1 and the second stem ST2, and branches BR extending diagonally from the first stem ST1 and the second stem ST2.

The shape of the pixel electrode PE may be the same as those of the pixel electrode PE described above. More particularly, referring to FIG. 11, a first pixel PX1, a second pixel PX2, and a third pixel PX3 may be formed on the first substrate 500, and the respective pixel electrodes PE of the first pixel PX1, the second pixel PX2, and the third pixel PX3 may have different shapes (see FIG. 2).

Referring to FIGS. 12 and 13, the method of manufacturing a display device according to an exemplary embodiment may further include forming a black matrix on the pixel electrode.

As described above, a gate black matrix G_BM extending along a gate line GL and a black matrix BM that covers corners of a display area DA may be disposed on the first substrate 500.

In the exemplary embodiments, the gate black matrix G_BM and the black matrix BM may include substantially the same material and formed simultaneously in the same process. The gate black matrix G_BM and the black matrix BM, however, may alternatively be formed independently in separate processes.

The black matrix BM of the non-display area NDA may partially overlap pixels disposed in the display area DA. More particularly, a portion of the pixels may be partially covered by the black matrix BM of the non-display area NDA. For example, referring to FIG. 13, a pixel area PA of each of the second pixel PX2 and the third pixel PX3 may be partially covered by the black matrix BM of the non-display area NDA.

According to exemplary embodiments of, the formation of dark portions in each pixel may be minimized. In addition, the formation of a dark portion at a side or a corner of a display area may be minimized.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A display device, comprising:
a first substrate;
a first pixel and a second pixel disposed adjacent to each other on the first substrate; and
a pixel electrode disposed in each of the first and second pixels, each pixel electrode comprising:
a first stem extending in a first direction between two first end portions;
a second stem intersecting the first stem and extending in a second direction different from the first direction between two second end portions; and
an intersection disposed where the first stem and the second stem meet, wherein:
the first and second end portions define at least a portion of an outer extent of a pixel area in each pixel; and
a first distance from a center of the pixel area of the first pixel to the intersection of the first pixel is different from a second distance from a center of the pixel area of the second pixel to the intersection of the second pixel.

2. The display device of claim 1, wherein the second distance is greater than the first distance.

3. The display device of claim 2, wherein the center of the pixel area of first pixel and the intersection of the first pixel overlap each other.

4. The display device of claim 1, further comprising a black matrix partially covering the second pixel,
wherein the black matrix does not overlap the intersection of the second pixel.

5. The display device of claim 4, further comprising a second substrate facing the first substrate,
wherein the black matrix is disposed on the second substrate.

6. The display device of claim 4, wherein the black matrix is disposed on the first substrate.

7. The display device of claim 4, wherein a boundary line of the black matrix traverses the second pixel.

8. The display device of claim 7, wherein the boundary line comprises a curved line having a first curvature.

9. The display device of claim 7, wherein the boundary line comprises a straight line having a first slope.

10. The display device of claim 1, further comprising a third pixel disposed adjacent to the second pixel, the third pixel comprising:
a first stem extending in the first direction;
a second stem extending in the second direction; and
an intersection disposed where the first stem and the second stem meet,
wherein a third distance from a center of the pixel area of the third pixel to the intersection of the third pixel is greater than the second distance.

11. A display device, comprising:
a first substrate;
a first pixel and a second pixel disposed adjacent to each other on the first substrate; and
a pixel electrode disposed in each of the first and second pixels, each pixel electrode comprising:
a first stem extending in a first direction between two first end portions;
a second stem intersecting the first stem and extending in a second direction different from the first direction between two second end portions; and
an intersection disposed where the first stem and the second stem meet, wherein:
the first and second portions define at least a portion of an outer extent of a pixel area in each pixel;
the first stem and the second stem divide the pixel area of each of the first and second pixels into a plurality of domains; and
the first pixel has a different number of domains than the number of domains in the second pixel.

12. The display device of claim 11, wherein:
the pixel area of the first pixel comprises four domains and the pixel area of the second pixel comprises two domains.

13. The display device of claim 11, further comprising a third pixel disposed adjacent to the second pixel, the third pixel comprising:
a first stem extending in the first direction;
a second stem extending in the second direction; and
an intersection disposed where the first stem and the second stem meet,
wherein the third pixel comprises one domain.

14. The display device of claim 13, further comprising a black matrix partially covering the second pixel and the third pixel,
wherein an area of the second pixel not covered by the black matrix is greater than an area of the third pixel not covered by the black matrix.

15. The display device of claim 13, wherein:
the intersection of the first pixel is disposed at a center of the pixel area of the first pixel;
the intersection of the second pixel is disposed at a side of the pixel area of the second pixel; and
the intersection of the third pixel is disposed at a corner of a pixel area of the third pixel.

16. The display device of claim 11, further comprising branches disposed in the domains, the branches extending diagonally from the first stem and the second stem.

17. The display device of claim 13, wherein an aperture ratio of the second pixel is greater than that of the third pixel and less than that of the first pixel.

18. A display device, comprising:
a substrate;
a first pixel and a second pixel disposed adjacent to each other on the substrate; and
a pixel electrode disposed in each of the first and second pixels, each pixel electrode comprising intersecting stems that divide the corresponding pixel into a plurality of domains,
wherein:
an aperture ratio of the first pixel is greater than that of the second pixel; and
the number of domains disposed in the first pixel is greater than that of the second pixel.

19. The display device of claim 18, further comprising a black matrix,
wherein the black matrix overlaps a greater area of the second pixel than the first pixel.

20. A display device, comprising:
a first substrate;
a first pixel and a second pixel disposed adjacent to each other on the first substrate; and
a pixel electrode disposed in each of the first pixel and the second pixel, each pixel electrode comprising:
a first stem extending in a first direction;
a second stem intersecting the first stem and extending in a second direction different from the first direction; and
an intersection disposed where the first stem and the second stem meet; and
a black matrix disposed on the first substrate and partially covering the second pixel, wherein the black matrix does not overlap the intersection of the second pixel.

* * * * *